United States Patent
Grubb

[15] 3,671,414
[45] June 20, 1972

[54] HYDROGEN ION-SELECTIVE SENSOR

[72] Inventor: Willard T. Grubb, Schenectady, N.Y.

[73] Assignee: General Electric Company

[22] Filed: March 10, 1971

[21] Appl. No.: 122,854

[52] U.S. Cl. ..................................204/195 R, 204/195 F
[51] Int. Cl. ..........................................G01n 27/46
[58] Field of Search.................204/1 T, 195 R, 195 F, 195 G

[56] References Cited

UNITED STATES PATENTS

| | | | |
|---|---|---|---|
| 2,183,531 | 12/1939 | Allison | 204/195 F |
| 3,413,209 | 11/1968 | Hersch | 204/195 R |
| 3,434,953 | 3/1969 | Porter et al. | 204/195 G |
| 3,463,717 | 8/1969 | Koopman et al. | 204/195 F |

Primary Examiner—T. Tung
Attorney—Richard R. Brainard, Paul A. Frank, Charles T. Watts, Paul R. Webb, II, Frank L. Neuhauser, Oscar B. Waddell and Joseph B. Forman

[57] ABSTRACT

A hydrogen ion-selective sensor comprises an elongated, flexible tube having opposite open ends and being electrically insulating, a silver-silver halide reference electrode positioned at least partially within the tube, an electrical lead in electrical contact with the reference electrode, a gelled electrolyte solution containing at least one halide salt solution filling the tube and in contact with the silver halide coated portion of the reference electrode and with the opposite end of the tube, a metal tube with an exterior surface of palladium surrounding at least a portion of the first tube, an electrical lead in contact with the metal tube, palladium oxide adhering tightly to at least a portion of the exterior surface of palladium on the metal tube, and electrical insulation surrounding the remaining palladium surface on the metal tube and its associated electrical lead.

7 Claims, 1 Drawing Figure

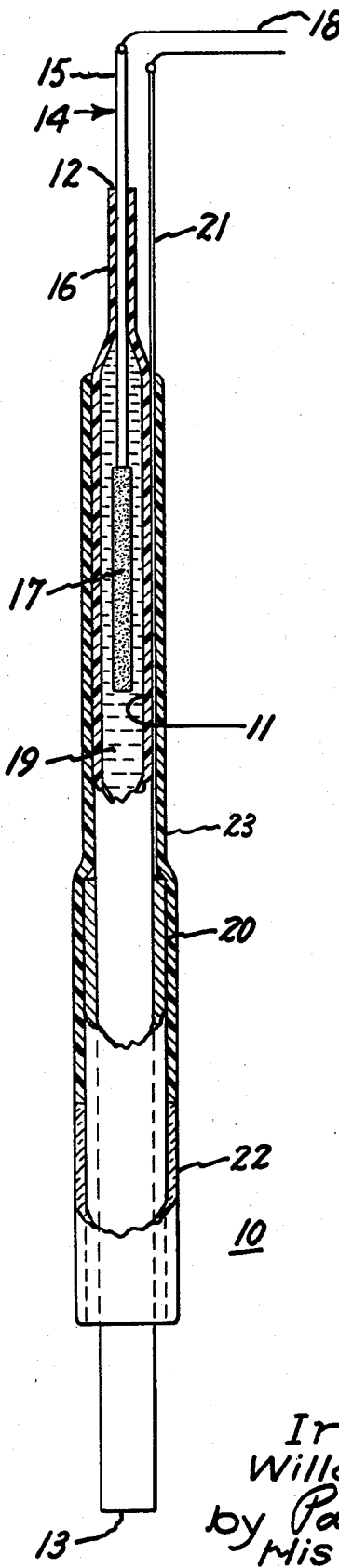

HYDROGEN ION-SELECTIVE SENSOR

Reference is made to copending U.S. Pat. application (RD-3751) entitled "Reference Electrode Half-Cell" filed Sept. 28, 1970 and given Ser. No. 75,866, which describes and claims a half cell including at least one gelled equitransferent salt solution filling an elongated, flexible electrically insulating tube. This copending application in the name of Willard T. Grubb, is assigned to the same assignee as the present application.

Reference is made to copending U.S. Pat. application (RD-3540) entitled "Hydrogen Ion-Selective Sensor and Electrode Therefor" filed Sept. 30, 1970, and given Ser. No. 76,794, which describes and claims a sensor and an electrode therefor which electrode has a palladium oxide coated palladium surface. This copending application in the names of Willard T. Grubb and Lawrence H. King, is assigned to the same assignee as the present application.

This invention relates to hydrogen ion-selective sensors and, more particularly, to hydrogen ion-selective sensors employing hydrogen ion-selective electrodes with palladium oxide adhering tightly to at least a portion of the palladium surface of a metal tube.

Sensors are employed to determine the content of a specific substance in a fluid or atmosphere. For example, a sensor might be employed to determine the content of oxygen, or carbon dioxide in a sample, or its content of hydrogen ions or other ions in solution.

Ion-selective sensors are known in the prior art for measuring the hydrogen ion activity or pH of a sample. Such a sensor employs a reference electrode and a sensing electrode, such as a glass electrode, immersed in a solution, whereby the potential difference between the two electrodes is a function of the concentration of the hydrogen ion in the solution. The reference electrode contains a salt solution. Electrical connection between the salt solution and the sample solution is made generally by a liquid contact through an aperture referred to as a liquid junction.

My present invention is directed to an improved miniaturized hydrogen ion-selective sensor which is suitable for biomedical, environmental control and other applications.

The primary objects of my invention are to provide a rugged, accurate and miniaturized ion-selective sensor.

In accordance with one aspect of our invention, a hydrogen ion-selective sensor comprises an elongated, flexible tube having opposite open ends and being electrically insulating, a silver-silver halide reference electrode positioned at least partially within the tube, an electrical lead in electrical contact with the reference electrode, a gelled electrolyte solution containing at least one halide salt filling the tube and in contact with the silver halide coated portion of the reference electrode and with the opposite end of the tube, a metal tube with an exterior surface of palladium surrounding at least a portion of the first tube, an electrical lead in contact with the metal tube; palladium oxide adhering tightly to at least a portion of the exterior surface of palladium on the metal tube, and electrical insulation surrounding the remaining palladium surface on the metal tube and its associated electrical lead.

These and various other objects, features and advantages of the invention will be better understood from the following description taken in connection with the accompanying drawing in which:

The single FIGURE is a sectional view of a hydrogen ion-selective sensor made in accordance with my invention.

In the single FIGURE of the drawing, there is shown generally at 10 a hydrogen ion-selective sensor embodying my invention. Hydrogen ion-selective sensor 10 is in the form of an elongated, flexible, heat shrinkable polymeric tube 11 with opposite initially open ends 12 and 13, and of electrically insulating material. A silver-silver halide reference electrode 14 is positioned at least partially within tube 11. Electrode 14 comprises a silver wire 15 positioned partially with tube 11 at its end 12 and extends outwardly from end 12. Tube 11 is bonded as at 16 to wire 15 adjacent end 12. At least a portion of silver wire 15 within tube 11 has a coating 17 of a silver halide, such as silver chloride thereon. An electrical lead 18 is in electrical contact with reference electrode 14. A gelled electrolyte solution containing at least one halide salt 19 fills the interior of tube 11. Gelled salt solution 19 is in contact with silver chloride coating 17 and in contact with the opposite open end 13 of tube 11. Open end 13 with gelled salt solution 19 in contact therewith forms a liquid junction contact for the reference electrode.

The liquid junction can be renewed readily by cutting off a small segment of the tube at its open end. This improvement is opposed to the prior art wherein the liquid junction must be flushed after use or if a porous plug is employed at such a junction it must be removed and cleaned after use. A metal tube 20 with an exterior surface of palladium surrounds at least a portion of first tube 11. An electrical lead 21 is in electrical connection with metal tube 20. A palladium oxide layer or surface 22 adheres tightly to the exterior palladium surface of tube 20. A heat shrinkable polymeric tube 23 fits over tube 11, lead 21 and palladium surface of tube 20.

I found that I could form an improved hydrogen ion-selective sensor by employing an elongated flexible tube having opposite open ends and being electrically insulating. My preferred tube is an elongated piece of heat shrinkable polymeric material such as polyethylene or polytetrafluoroethylene which is electrically insulating. The exterior surface of the tube is surrounded at least partially by a metal tube with an exterior surface of palladium. Such a tube can be formed of a number of different metals onto the exterior surface of which the palladium surface is applied. Such a metal tube includes a tube of palladium metal.

I found that a silver-silver halide reference electrode can be positioned at least partially within the first tube in a variety of manners. My preferred reference electrode comprises a silver wire positioned partly within the tube at one end thereof and extending outwardly from the one end, and a coating of silver halide such as silver chloride on a portion of the silver wire positioned within the tube. With the preferred reference electrode and the tube made of a heat shrinkable polymer, I prefer to bond the end of the tube to the silver wire. This end of the tube through which the silver wire extends can be left open or can be closed by other means. It is generally preferred that the sealing around the open end of the tube be of electrically insulating material so that there is no shorting from the reference electrode.

Such s silver-silver halide reference electrode can also be provided by coating the interior surface of the electrically insulating material within the tube with silver and providing at least a portion of the silver with a coating of a silver halide such aS silver chloride. I found that while silver chloride is preferred other halides may be employed except a fluoride. An electrical lead is then affixed in any suitable manner such as by welding preferably to the end of the reference electrode outside of the tube. A gelled electrolyte solution containing at least one halide salt solution fills the interior of the tube and contacts the silver halide portion of the reference electrode.

The interior of the first tube is filled in one method by a syringe with a gelled halide salt solution, such as a gelled potassium chloride solution. A silver wire which is chlorided over a portion thereof is positioned in one end of tube so that the silver chloride portion of the wire is within the tube. The interior surface of the first tube is then bonded to the silver wire which extends outwardly from the end of the tube. With the heat shrinkable polymer tube the bonding to the wire is accomplished easily by heating one end portion of the tube. The gelled salt solution is in contact also with the opposite open end of the tube thereby forming a liquid contact. A wide variety of polymeric tubing can be employed which in elongated form provides a flexible structure. The gelled halide salt solution must not flow under gravity during use but can be introduced initially into the tube as a liquid at elevated temperature or as a gel forced into the tube under pressure. The preferred salt solution is potassium chloride solution, but other halide salt solutions such as ammonium chloride, rubidium chloride, and mixtures thereof, can be used.

A variety of gelling agents can be employed to produce the gelled equitransferent salt solutions. One preferred gelling agent is a Carbopol polyacrylic acid gelling agent manufactured by B. F. Goodrich Chemical Company, 3135 Euclid Avenue, Cleveland, Ohio. Such gelling agents are neutralized with sodium hydroxide to provide the respective salt. The neutralized gelling agent was added to the halide salt solution to produce the gelled salt solution.

Other suitable gelling agents include the polymers of acrylic acid, carboxy polymethylene, carboxymethyl cellulose, methyl cellulose, algin, agar, polyethylene oxide, polyvinyl alcohol, and mixtures thereof.

A metal tube with an exterior surface of palladium is positioned around at least a portion of the first tube. One preferred method is by fitting a section of palladium metal tubing snugly over the flexible polymeric tubing, the palladium tube having previously been coated with palladium oxide over at least a portion of its exterior surface. In this structure, a portion of the polymeric tube is pushed through the palladium tubing and cut off to renew the liquid junction as required during use.

The palladium oxide surface was applied to a portion of the exterior surface of the palladium tube. In a preferred manner, this was accomplished by coating the exterior surface of the palladium with 50 percent aqueous sodium hydroxide solution, drying it in air and then heating to 800°C for 20 minutes in air to form a coating of palladium oxide.

If a high temperature base metal is employed for the tube, an exterior surface of palladium is applied thereto. The surface of palladium oxide can be applied by employing the high temperature reaction of palladium with oxygen from the air in the presence of an alkali metal hydroxide. The parameters of preparing such an oxide electrode were investigated as to the choice of time and temperature of the reaction, the choice of the alkali metal hydroxide and its concentration, precleaning and roughening of the palladium base member and the use of electrical insulation on the portion of the base member. The treatment of the exterior palladium surface of the base member at a temperature of 800°C appears to be the optimal temperature. However, palladium oxide can be formed on such a surface as low as 350°C and up to about 938°C where the oxide decomposes. Of the alkali metal hydroxides tested, sodium hydroxide gave the best electrode with potassium hydroxide providing good electrodes. Lithium hydroxide did not appear to work. In the process, precleaning and roughening of the exterior palladium surface of the base member was found to be required for best results. Such precleaning and roughening was accomplished by dipping in aqua regia for about 30 seconds or sand blasting or a combination of both. The heating period at 800°C was varied from about 25 seconds to 120 minutes. Within this time period the optimal time was 10-20 minutes.

A second electrical lead is connected at one end to the metal tube. A heat shrinkable polymeric tube is slipped over the first polymeric tube and second electrical lead which extends exteriorly of the sensor. One end of the polymeric tube is positioned against the upper edge of the palladium oxide surface and the polymeric tube is shrunk by heating. The resulting device, which is connected to a high impedance voltmeter, is a hydrogen ion-selective sensor made in accordance with my invention.

In an illustrative operation of my hydrogen ion-selective sensor, the sensor is assembled as above described and as shown in the single FIGURE of the drawing using a gelled potassium chloride salt solution. The open end of the sensor and associated palladium oxide on a palladium surface is placed in a solution. The potential difference between the reference electrode and palladium oxide electrode is a function of the concentration of the hydrogen ion in the solution.

Examples of a hydrogen ion-selective sensor made in accordance with my invention are set forth below:

EXAMPLE 1

A hydrogen ion-selective electrode was made in accordance with my invention as described above and as shown in the single FIGURE of the drawing by employing a 6 inch long heat shrinkable tube of polytetrafluoroethylene. A palladium tube was fitted over a portion of the first tube near one end. A portion of the first tube extended outward through the second tube. A layer of palladium oxide was formed on the palladium surface of the second tube by coating the palladium surface with 50 percent aqueous sodium hydroxide solution, drying it in air, and then heating to 800°C for 20 minutes in air to form a coating of palladium oxide.

A gelled salt solution was prepared by using agar as the gelling agent. 2 percent by weight of agar was added to hot 3 N potassium chloride solution in water to produce upon cooling a gelled 3 normal potassium chloride solution which did not flow under gravity. The tube was filled with the hot salt solution containing agar under a mild vacuum. A reference electrode consisting of silver wire which had a coating of silver chloride adjacent one end thereof was inserted in one end of the tube so that the silver chloride coating portion of the wire was within the tube and the silver wire portion extended outwardly from the tube. Heat was applied to the end of the tube containing the reference electrode whereby because of the heat shrinkability of the tube it was bonded directly to the reference electrode. The gelled salt solution was in contact with the opposite open end of the tube thereby providing a liquid junction. An electrical lead was connected to the end of the silver wire.

A second electrical lead was connected to the upper end of the metal tube and a heat shrinkable polyolefin tube was fitted over the first tube and the second electrical lead and overlapped the upper end of the metal tube. The other end of the electrical lead extended outside of the shrinkable tube. Heat was then applied to shrink fit the second heat shrinkable tube. The leads were connected to a high impedance voltmeter. The resulting structure was a hydrogen ion-selective sensor made in accordance with my invention.

EXAMPLE 2

The sensor of Example 1 was tested in a series of phosphate buffer over the pH range of 3.0 to 9.0. The sensor had a fast response time of 15 to 30 seconds. The change of voltage in the above pH range was 273 mV, and the voltage-pH response was linear.

While other modifications of the invention and variations thereof which may be embraced within the scope of the invention have not been described, the invention is intended to include such as may be embraced within the following claims.

What I claim as new and desire to secure by Letters Patent of the United States is:

1. A hydrogen ion-selective sensor comprises an elongated, flexible tube having opposite open ends and being electrically insulating, a silver-silver halide reference electrode positioned at least partially within the tube, an electrical lead in electrical contact with the reference electrode, a gelled electrolyte solution containing at least one halide salt solution in the tube and in contact with the silver halide coated portion of the reference electrode and with the opposite end of the tube, a metal tube with an exterior surface of palladium surrounding at least a portion of the first tube, an electrical lead in contact with the metal tube, palladium oxide adhering tightly to at least a portion of the exterior surface of palladium on the metal tube, and electrical insulation surrounding the remaining palladium surface on the metal tube and its associated electrical lead.

2. A hydrogen ion-selective sensor as in claim 1, wherein the reference electrode is a coating adhering firmly to the interior surface of the electrically insulating tube.

3. A hydrogen ion-selective sensor as in claim 1, wherein the reference electrode is a silver wire positioned partly within the tube at one end thereof and extending outwardly from the one end and a coating of a silver halide on a portion of the silver wire positioned within the electrically insulating tube.

4. A hydrogen ion-selective sensor as in claim 3, wherein the flexible tube is bonded to the silver wire at the said one end of said flexible tube.

5. A hydrogen ion-selective sensor as in claim 1, wherein the halide salt solution is potassium chloride solution.

6. A hydrogen ion-selective sensor as in claim 1, wherein the metal tube is a palladium metal tube.

7. A hydrogen ion-selective sensor as in claim 1, wherein the electrically insulating tube is a polymeric heat-shrinkable tubing.

* * * * *